Aug. 15, 1950 — D. L. STRAUSS — 2,518,646
FLEXIBLE DISK PLOW

Filed Nov. 7, 1947 — 2 Sheets-Sheet 1

Inventor
David L. Strauss

Aug. 15, 1950  D. L. STRAUSS  2,518,646
FLEXIBLE DISK PLOW

Filed Nov. 7, 1947  2 Sheets-Sheet 2

Inventor
David L. Strauss
By Clarence A. O'Brien
and Harvey B. Jacobson
Attorneys Patented Aug. 15, 1950

2,518,646

UNITED STATES PATENT OFFICE 2,518,646

FLEXIBLE DISK PLOW

David L. Strauss, Boise City, Okla., assignor of one-third to Edmund D. Phillips, Boise City, Okla.

Application November 7, 1947, Serial No. 784,701

3 Claims. (Cl. 97—53)

This invention relates generally to plows and more particularly to a beam construction for a multiple disc plow and the combination of this beam construction with a ground wheel having novel adjustable mounting at the front of the plow.

The primary object of this invention is to provide means whereby the discs of the plow are all allowed to engage the ground to an equal depth, thus more effectively and evenly cultivating uneven ground and more positively eradicating weeds throughout the full swath or length of the plow.

Another object of a specific character is to provide a disc plow construction in which a ground wheel, herein considered to designate a ground-contacting wheel used to control the height of the plow beam above the adjacent ground, is mounted on the front side of the plow and substantially at the hinge point of two sections of the plow beam. This arrangement has been found to provide for more even penetration of the ground by the discs of the plow, partly because positioning of this wheel behind the discs causes the wheel to ride on the earth loosened by the discs and since the hinge joints of sectional plow beams cannot practicably be made to work absolutely freely, this rear positioning of the ground wheel in other plows allows the wheel to cut into the loosened earth to a greater or lesser extent rather than causing the lifting and lowering of the adjacent portion of the frame. In the instant invention, the ground wheel is in contact with the relatively hard ground in front of the plow and the adjacent portion of the beam is raised and lowered in more perfect conformity with the contour of the ground traversed by the wheel in relation to the contour of the ground traversed by the plow discs positioned near the outer ends of the beam sections, thus assuring more even penetration. Furthermore, placement of the ground wheel so that the same will contact the relatively hard ground in front of the plow allows the same size of wheel to be used with longer beams.

Still another object of this invention is the provision of simple and reliable means whereby the ground wheel may be pivotally adjusted in a horizontal plane, as well as in a vertical plane.

Another object is to provide a simplified sectional beam with hinge structure facilitating the mounting of the ground wheel and also allowing the use of a single relatively long hinge pin, thus simplifying the manufacture as well as the maintenance of the plow.

And a last object to be specifically mentioned is to provide a plow beam construction which is relatively inexpensive and entirely practicable to manufacture, simple and convenient as well as safe to use, and which will give generally efficient and durable service.

With these objects, as well as other inherent and specific objects which will become evident as this description proceeds, this invention resides in certain novel improvements and refinements in construction, combination and arrangement of parts and portions as will be described in the specification, particularly pointed out in the appended claims, and illustrated in the accompanying drawings which form a material part of this disclosure, and in which:

Similar characters of reference relate to similar or identical parts and portions throughout the specification and throughout the several views of the drawings.

Figure 1:
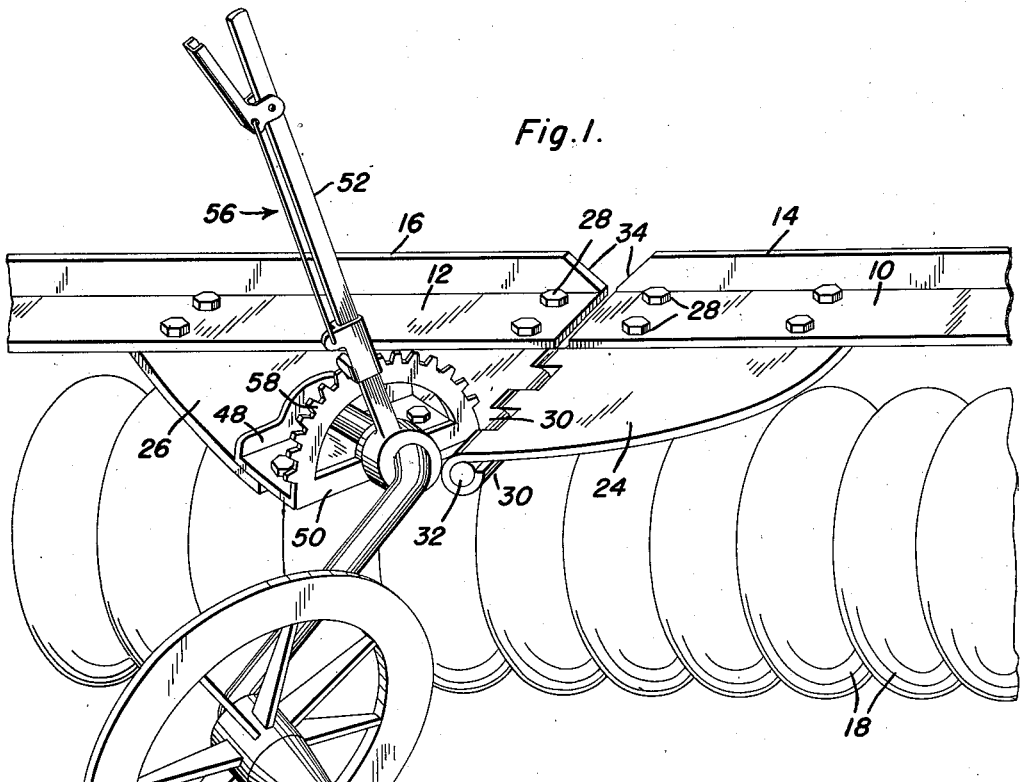
Figure 1 is a fragmentary perspective view of the center portion of a disc plow having this invention incorporated therewith.
Figure 2:
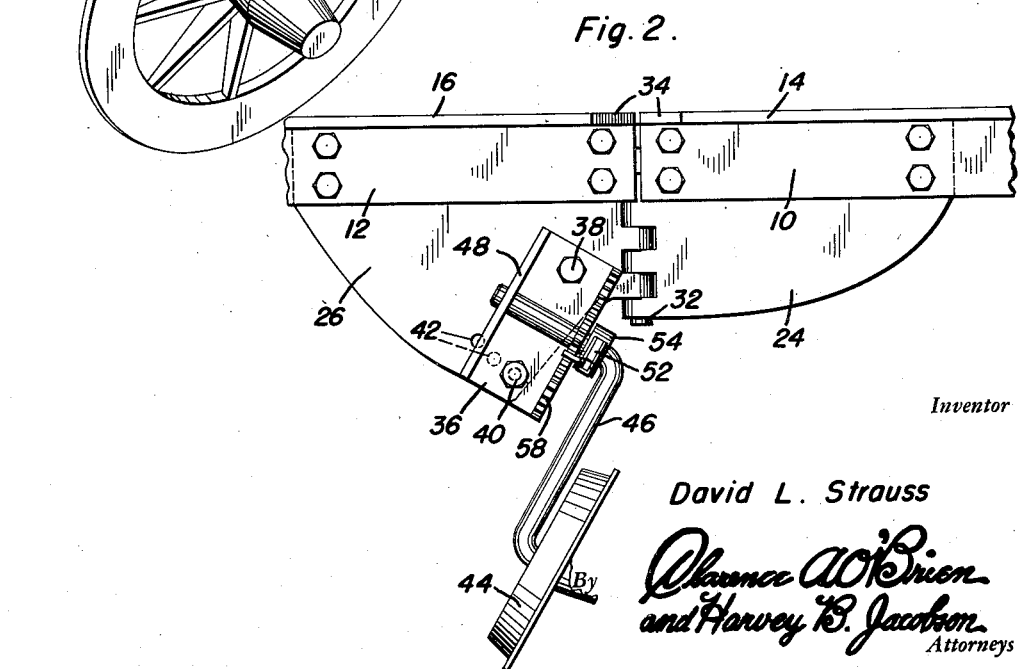
Figure 2 is a top plan view of this improved beam construction with a ground wheel carried thereby.

Referring now to the drawings, it should first be noted that these drawings do not include draft means nor means to link the illustrated plow beam into still larger implements, the former being thought of as extraneous to this application and the latter being ordinarily unnecessary as this improved beam structure, combined with the forward positioning of the ground wheel, allows a pair of beam sections of lengths in the order of fifteen feet or more in length.

The sections 10 and 12 of the beam will ordinarily be of substantially equal length and each section includes an elongated angle plate in which the vertical flange 14 or 16 reinforces the section against bending, while the horizontal flange may be used as a table upon which weights may be placed to increase penetration of the ground by the discs 18. These discs are carried on shafts 20 rotatably mounted in brackets 22 or otherwise conventionally mounted on the under sides of the horizontal flanges of the sections 10 and 12.

The sections have horizontally disposed extending portions 24 and 26 secured, as by bolts 28, to the adjacent ends of the sections, and these portions are provided with rugged interlocking hinge parts 30 adapted to receive a relatively long hinge pin 32. The adjacent ends of the vertical flange 14 are bevelled, as at 34, to allow free hinge movement. The portions 24 and 26 and the ground wheel 44 hereinafter described are disposed on the side of the beam which will be in front of the plow, by reason of the positioning of the draft means for the plow, not shown in the drawings.

The extending portion 26 has a channel bracket 36 adjustably mounted thereon by a pivot pin 38 of bolt character inserted through the bracket and the portion 26 and a bolt 40 inserted through the bracket and selectively inserted through the regularly spaced apertures 42 in the portion 26. A ground wheel 44 of conventional character is rotatably mounted on the offset axle 46 which has its upper end pivoted in the upstanding flanges 48 and 50 of the bracket 36. In order to make the ground wheel 44 vertically adjustable relative to the beam, a lever 52 is rigidly secured to the offset axle 46 adjacent the flange 50 of the bracket 36 by a collar 54. This lever has a complement of locking means 56 associated with a toothed rack 58 integral with the flange 50.

Figure 5:
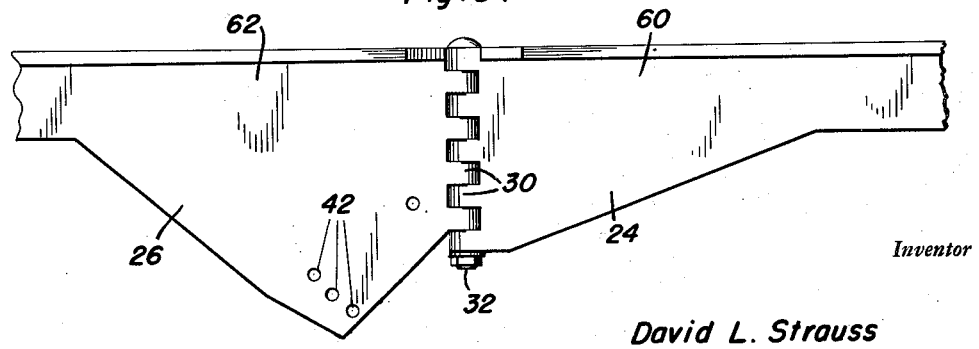
Figure 5 is a fragmentary plan view of the hinged portions of a sectional beam construction of a slightly modified form in which each of the sections is of unitary construction.

In the simplified embodiment of this invention illustrated in Figure 5, the beam sections 60 and 62, corresponding to the beam sections 10 and 12, and the extending portions 24 and 26 are of unitary construction.

Figure 3:
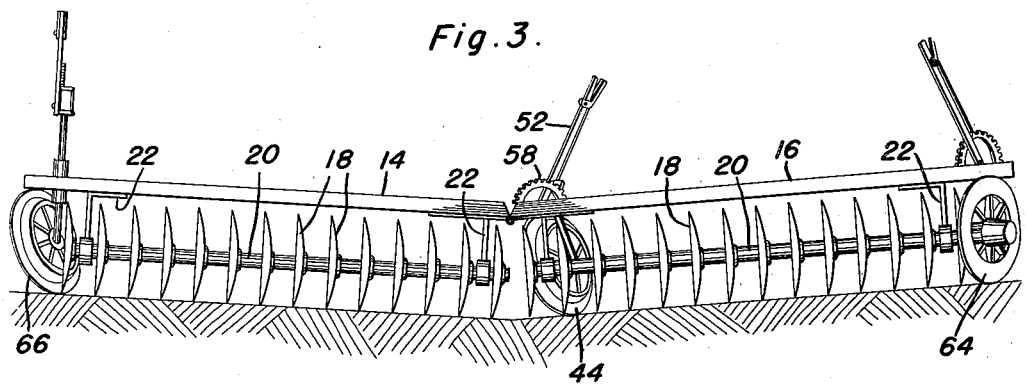
Figures 3 and 4 are views of general side elevational character designed to illustrate how this improved beam and ground wheel construction allows the plow to adapt itself to uneven ground.
Figure 4:
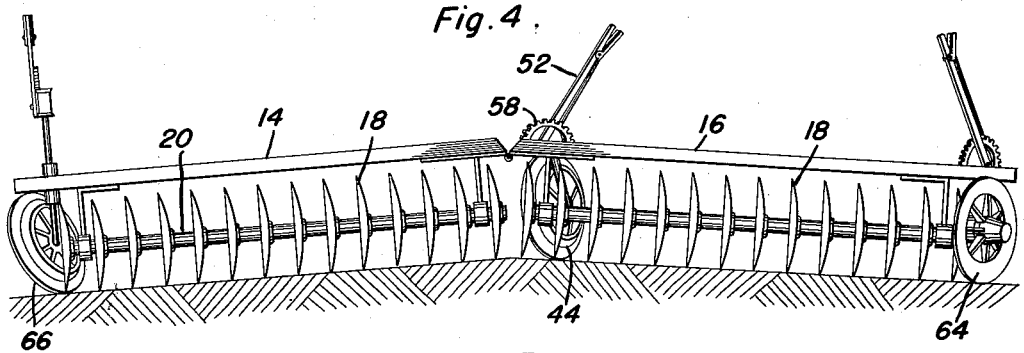

The adjustably mounted end ground wheels 64 and 66 illustrated in Figures 3 and 4 are included in the drawings in order that a complete operative structure may be illustrated but this invention does not extend to specific structure of these end ground wheel assemblies.

The operation of this invention will be clearly understood from a consideration of the foregoing description of the mechanical details thereof taken in connection with the above recitation of the objects of this invention, and it will be clear that all of these objects are amply attained. In recapitulation, it may be added that the improved plow may be used like other disc plows and that draft means adapting the plow for use with different types of tractors or to be horse-drawn or combined with other implements will be secured in any suitable manner to the sections 10 and 12, the means of securement necessarily allowing the reasonably free hinge action between the sections.

Minor variation may be made in the details of construction and proportionment of the various elements of this invention without departure from the spirit and scope thereof which should be limited only by a proper interpretation of the terms used in the appended claims.

Having described the invention, what is claimed as new is:

1. A beam construction for a multiple disc plow comprising a pair of substantially equally dimensioned elongated beam sections hinged together to allow the sections to follow the contour of the land individually as the plow is propelled, the said sections having abutting horizontally extended portions at the hinged ends thereof, and an elongated hinge pin securing said portions together, one of said portions having a ground wheel mounted thereon for adjustment both vertically and about a vertical axis.

2. A beam construction for a multiple disc plow comprising a pair of substantially equally dimensioned elongated beam sections hinged together to allow the sections to follow the contour of the land individually as the plow is propelled, the said sections having abutting horizontally extended portions at the hinged ends thereof, and an elongated hinge pin securing said portions together, one of said portions having a ground wheel mounted thereon, said wheel having its axle vertically adjustably mounted in a bracket, and means to mount said bracket on said one portion for horizontal pivotal adjustment.

3. A beam construction for a multiple disc plow comprising a pair of substantially equally dimensioned elongated beam sections hinged together to allow the sections to follow the contour of the land individually as the plow is propelled, the said sections having abutting horizontally extended portions at the hinged ends thereof, and an elongated hinge pin securing said portions together, one of said portions having a further horizontally extending portion and a ground wheel mounted thereon, said wheel having its axle vertically adjustably mounted in a bracket, and means to mount said bracket on said further extending portion for horizontal pivotal adjustment, said means comprising a pivot pin secured through said bracket and said further extending portion, a plurality of spaced apertures in said further extending portion equidistant from said pivot pin and bolt means insertable through said bracket and selectively in said apertures.

DAVID L. STRAUSS.

REFERENCES CITED

The following references are of record in the file of this patent:

UNITED STATES PATENTS

| Number | Name | Date |
| --- | --- | --- |
| 911,703 | Clay | Feb. 9, 1909 |
| 1,921,480 | Ray | Aug. 8, 1933 |